United States Patent [19]

Macdonald

[11] Patent Number: 4,697,175
[45] Date of Patent: Sep. 29, 1987

[54] LIGHTPEN CONTROL CIRCUIT

[75] Inventor: John B. Macdonald, West Windsor Township, Mercer County, N.J.

[73] Assignee: American Telephone and Telegraph Company, AT&T Technologies, Inc., Berkeley Heights, N.J.

[21] Appl. No.: 595,124

[22] Filed: Mar. 30, 1984

[51] Int. Cl.⁴ .............................................. G09G 1/00
[52] U.S. Cl. ..................................... 340/707; 340/814
[58] Field of Search ................. 340/707, 708, 712, 814

[56] References Cited
U.S. PATENT DOCUMENTS

| | | | |
|---|---|---|---|
| 3,543,240 | 11/1970 | Miller et al. | 340/711 |
| 4,315,282 | 2/1982 | Schumacher | 340/707 |
| 4,329,634 | 5/1982 | Monteath et al. | 340/707 |
| 4,367,465 | 1/1983 | Mati et al. | 340/707 |

OTHER PUBLICATIONS

Osborne, An Introduction to Microcomputers, 1980, pp. 5-57 to 5-68.

Primary Examiner—Marshall M. Curtis
Attorney, Agent, or Firm—Robert B. Levy

[57] ABSTRACT

A control circuit for a lightpen of a random scanning computer graphics system (10) enabling the detection of lightpen interrupts or hits on contiguous vectors having drawing periods shorter than the response time of the lightpen (13). The lightpen interrupts are temporarily held in a peripheral circuit (31,32,34,36) and are selectively released to the computer system (via 29,21) at the end of its INTERPRET phase, i.e., at the end of a period during which the display processor decides how to handle the next display instruction. The present arrangement, which prevents the arrival of the lightpen interrupt signal during the INTERPRET phase, achieves a computer graphics system exhibiting maximum use of the information furnished by lightpen hits.

6 Claims, 3 Drawing Figures

LIGHTPEN CONTROL CIRCUIT

TECHNICAL FIELD

The present invention is directed to computer graphics system, and more particularly, to a control circuit for a lightpen of a random scanning computer graphics system.

BACKGROUND OF THE INVENTION

In the area of computer graphics, often a lightpen is used to detect the presence of the swept beam of a Cathode Ray Tube (CRT) within the optical aperture of the lightpen. This event, generally recorded by a solid state sensor in the pen, is amplified by appropriate electronics, and an interrupt signal is sent to the computer system that controls the display process. This interrupt causes certain software to be executed within the computer in response to the lightpen strike or hit. Such software generally interrogates appropriate registers in the display processor so that the associated address of data in a display list is found, together with general status information such as present beam location expressed in a set of orthogonal coordinates.

The lightpen requires a threshold amount of light energy to excite the detection electronics. This energy is derived from the energy conversion process that takes place in the CRT phosphor, where the kinetic energy of the beam electrons is transformed to light output from the phosphor. This process is not instantaneous, and it creates a delay in producing the light needed to energize the pen. The delay is largely a function of the particular phosphor or phosphor mix used in the CRT. Modern displays move the beam at a high linear velocity. There is inevitably a significant delay between the entry of the electron beam into the area of the lightpen aperture, and the generation of adequate light energy from that area of the CRT. This energy must be transferred to and detected in the pen itself, and the event registered in the computer as a "lightpen interrupt". Each of these processes creates a delay in recording the pen hit. On pen strikes well within long vectors displayed on the CRT this is of little consequence because the strike will be registered some time after the beam has passed through the pen aperture, and the display list address and display status information will be correct. Useful pen information will be derived even if the associated orthogonal coordinates location information is somewhat outside the beam aperture.

Problems arise when the pen hit is towards the end of a screen vector. When a vector is ended, the CRT beam is switched off, and the display processor goes into an INTERPRET mode during which the display processor and possibly the host computer decide how to handle the next display instruction. This may typically be another vector, a character, a reset position command, etc. The arrival of a lightpen interrupt during this INTERPRET phase when the beam is off generally gives rise to problems in that it is generally inconvenient to interrupt the interpretation process, and it is complex to develop a full set of algorithms in hardware or software to reliably process such pen-hit data. One known solution is to reject or ignore the "hit". However, rejecting or ignoring the hit may have the effect of making it impossible to interact, by means of a lightpen, with a displayed pattern that consists of a large number of very short vectors, as is typically the case with a circle. This is a drawback existing in several commercially available graphics systems.

Therefore, there exists a need for a computer graphics system capable of detecting lightpen interrupts or hits on contiguous vectors having drawing periods shorter than the response time of the lightpen thereby exhibiting maximum use of the information furnished by lightpen hits.

SUMMARY OF THE INVENTION

The foregoing need is met in an illustrative embodiment of the invention wherein a lightpen control circuit for a random scanning computer graphics system comprises means for generating computer interrupt signals in response to lightpen hit signals, lightpen enabling signals and cathode ray tube (CRT) beam-on signals; means for temporarily storing a lightpen hit signal registered after the termination of a beam-on signal; and means for selectively releasing the temporarily stored lightpen hit signal as a computer interrupt signal coincident with the beginning of the next succeeding beam-on signal.

DETAILED DESCRIPTION

Figure 1:
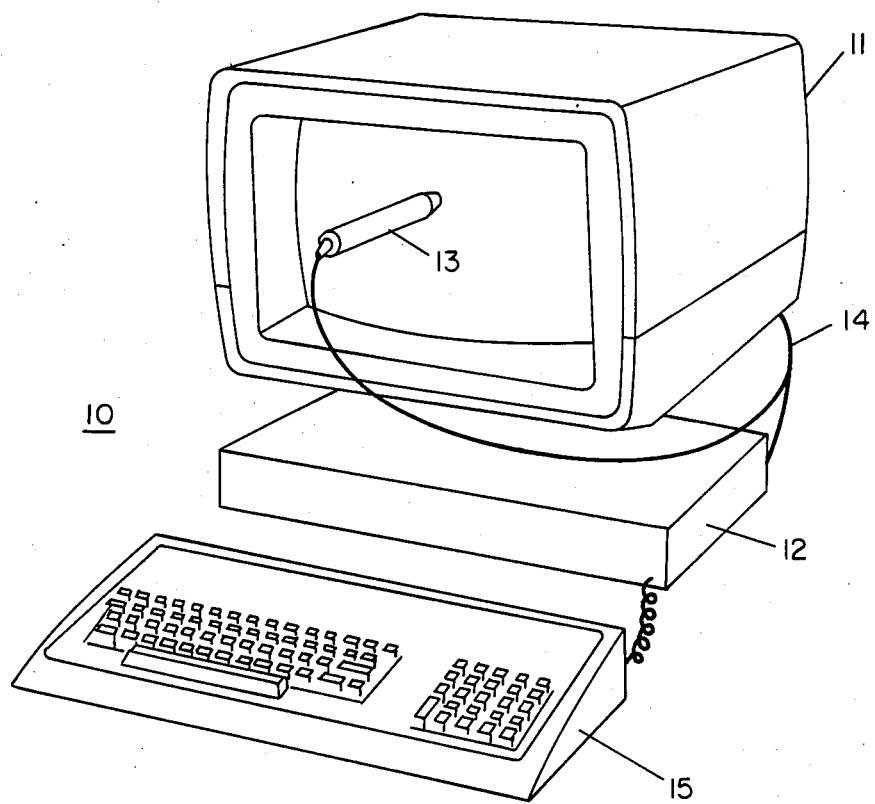
FIG. 1 is a perspective view of a known computer graphics system making use of a lightpen.

Shown in FIG. 1 is a typical computer graphics system 10 comprising a CRT display unit 11 operating under the control of a processor 12, e.g., a minicomputer, a desk top computer, or another type of commercially available computer typically connected to a keyboard 15. A lightpen 13, to be held by a user, is connected to the graphics system 10 by means of a cable 14. As mentioned above, the lightpen 13 contains photosensitive elements that generate electrical signals in response to the light energy emanating from the CRT display unit 11. The information displayed on the CRT display unit 11 may include alphanumeric characters of various sizes, types, or fonts, as well as graphical images combining straight and curved lines. The lightpen 13 may be used to pick selected portions of the information displayed on the CRT display unit 11. In other words, the user, by means of the hand-held lightpen 13, can inform the graphics system that the lightpen is at a desired location on the CRT display unit 11 or that a selected operation is to be performed on the displayed information.

Figure 2:
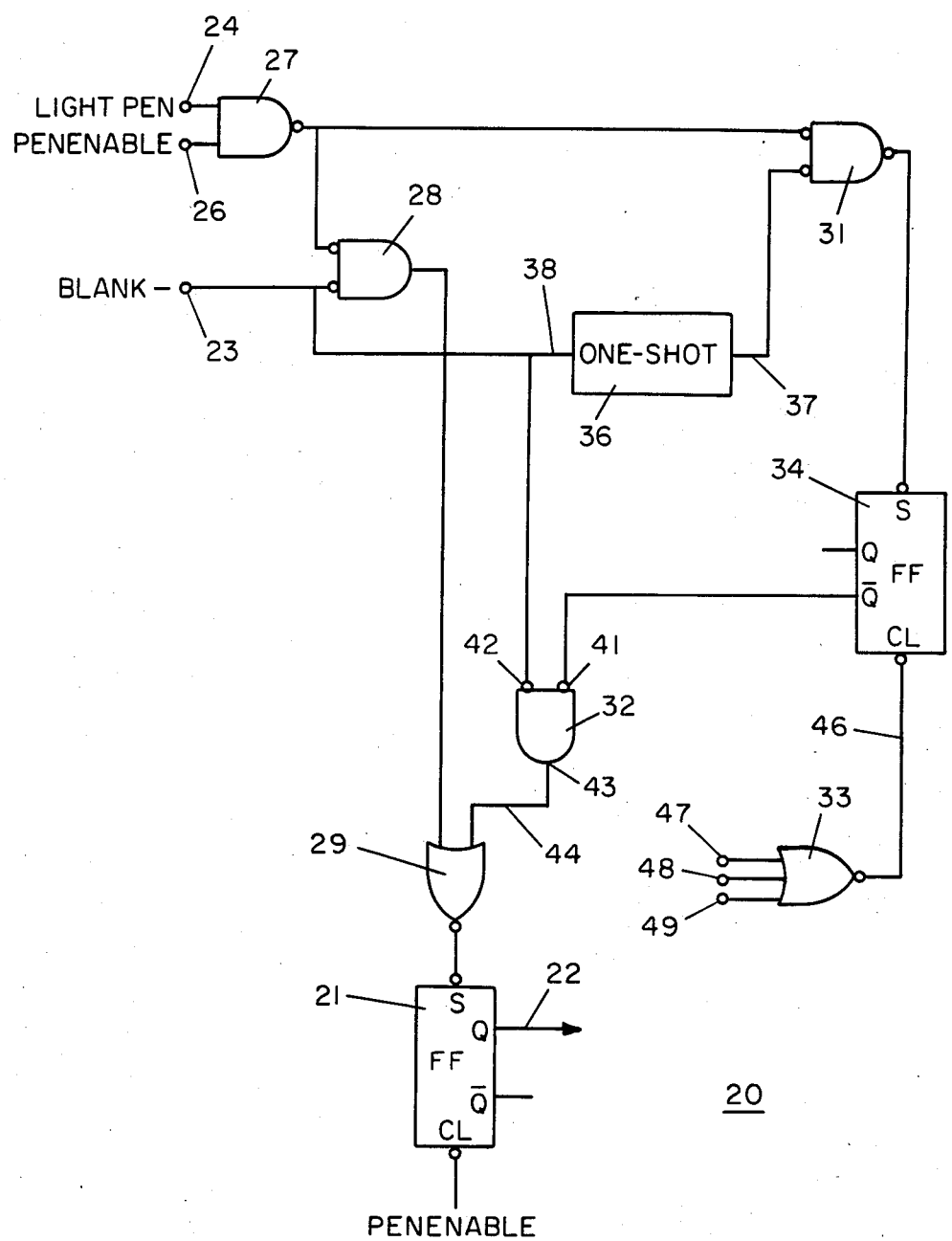
FIG. 2 is a schematic circuit diagram of a lightpen control circuit in accordance with an embodiment of the present invention.

FIG. 2 shows a lightpen control circuit 20 in accordance with an embodiment of the invention wherein a flip-flop 21, herein called the lightpen flip-fop 21, generates computer interrupt signals at its output terminal lead 22. The lightpen flip-flop 21 may be set to its ON or one state when the electron beam of the CRT display unit (e.g., 11 in FIG. 1) of the computer graphics system is "ON". The beam-on signal is indicated by a binary signal called BLANK- in the low or ground state present at input terminal 23. A lightpen hit is indicated by a signal called LIGHTPEN on input terminal 24 while a high state PENENABLE signal at input terminal 26 allows the lightpen hits to propagate through a NAND gate 27 and an inverted inputs AND gate 28. the PE- NENABLE signal is also coupled to the CLEAR input terminal of the lightpen flip-flop 21 for resetting it to its OFF or zero state. The PENENABLE signal is controlled from the computer (not shown in FIG. 2), usually via status bits held in parameter words in the display list, and insures that the lightpen 13 is enabled or active only during the drawing of those parts of the CRT displayed image where it would be useful to get a lightpen hit. Coupled between AND gate 28 and the set input terminal of the lightpen flip-flop 21 is a NOR gate 29.

The portion of the lightpen control circuit 20 comprising the gates 27, 28 and 29 and flip-flop 21 represents conventional circuitry commonly used in known computer graphics display systems. The operation of such conventional circuitry is as follows: with the LIGHTPEN and PENENABLE signals at a high state, gate 27 produces a low state output signal. The latter is combined with the beam-on signal, BLANK-, to produce a high state signal at the output terminal of gate 28. This in turn is ORed and inverted at gate 29 to produce a low output which is applied to the SET input terminal of the lightpen flip-flop 21. This flip-flop 21 going in its ON or one state would deliver a high state signal on its output terminal lead 22 thereby causing an interrupt in the computer. After the registration of the lightpen hit, the lightpen flip-flop 21 must be cleared or reset to avoid the generation of multiple interrupt signals. Typically, the flip-flop 21 is cleared or reset by grounding the PENENABLE signal under computer control, i.e., by applying a low state signal to the clear input terminal CL of the lightpen flip-fop 21.

The remaining circuitry shown in FIG. 2 comprising logic gates 32, 32 and 33, flip-flop 34 and re-settable one-shot multivibrator 36, in addition to the above-described conventional control circuitry including the logic gates 27, 28 and 29 and the lightpen flip-flop 21, make up the improved lightpen control circuit in accordance with an embodiment of the present invention. The signal produced at the output terminal 37 of the re-settable one-shot multivibrator 36 is a "trailing-edge delayed" copy of the beam-on signal, BLANK-, applied at terminal 23 and also coupled to an input terminal of the one-shot multivibrator 36 via lead 38. Typically, the delay on the trailing edge of the BLANK- signal is of the order of the maximum delay associated with the overall lightpen circuitry. In other words, the period during which the lightpen 13 may be sensitized is equal to the time during which the beam is ON, i.e., during the duration of a BLANK- signal, plus a short delay period after the beam goes OFF. An advantage of this invention is that the additional time beyond which the pen is sensitive to "hits" beyond the time when the beam is ON is minimized, thus protecting the user in most cases from extraneous interrupts possibly caused by the pen "seeing fluorescent lights, reflections, etc.

Figure 3:
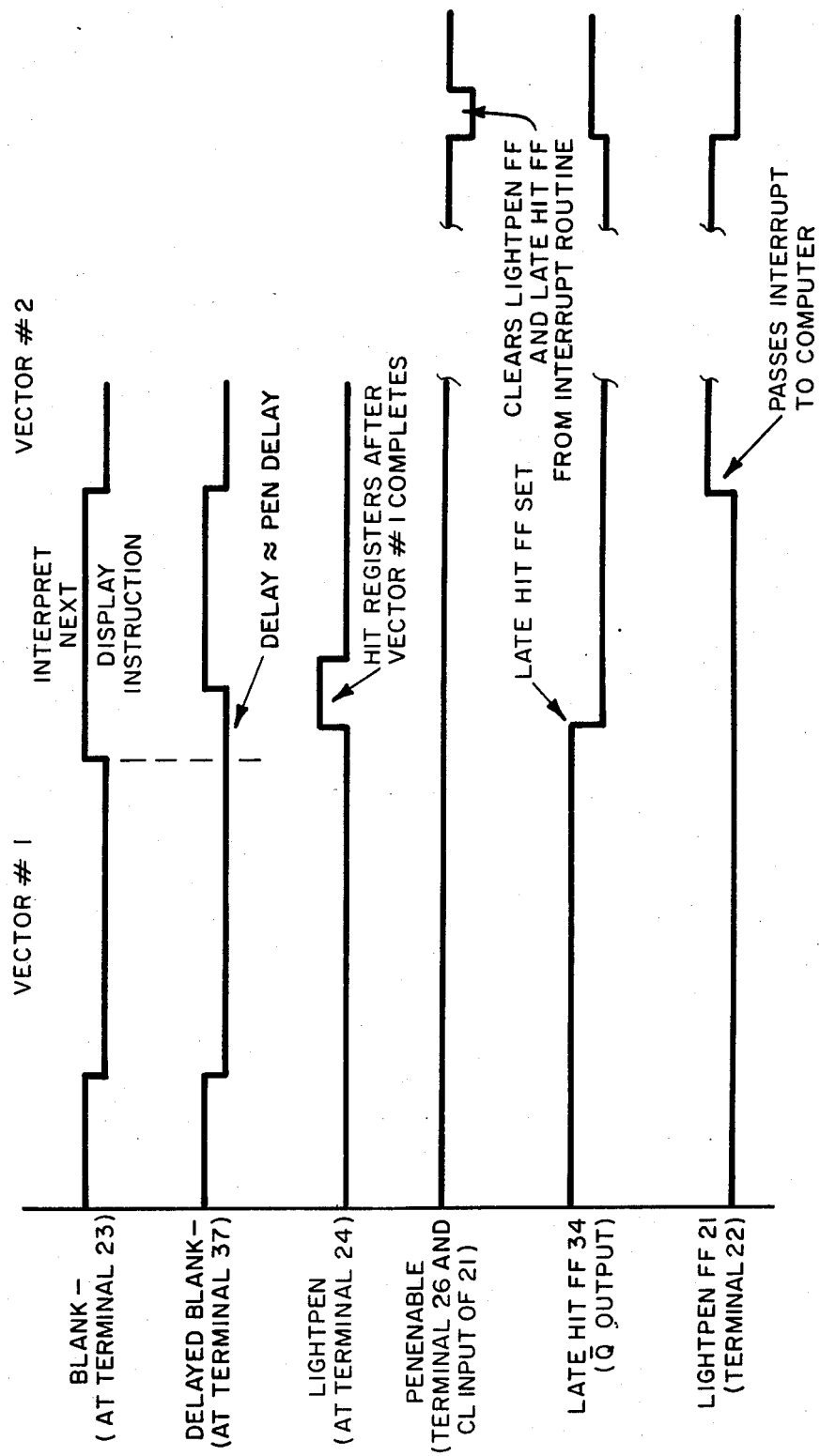
FIG. 3 is a time waveform diagram of signals at different locations of the lightpen control circuit of FIG. 2.

In accordance with an embodiment of the present invention, lightpen hits which are recorded just after the electron beam has gone OFF, as shown in FIG. 3, do not directly set the lightpen flip-flop 21 as would a conventional lightpen control circuit. Instead, the lightpen hits are temporarily stored in a flip-flop 34, herein called the late- hit flip-flop 34, which will hold the lightpen hit after the beam has gone OFF and during the period when the display processor reverts to the INTERPRET mode while decoding the next display instruction.

Shown in FIG. 3 are the waveforms of various signals, at different locations of the control circuit 20, associated with the handling of a "late" lightpen hit, assuming that we are dealing with contiguous short displayed vectors, e.g., vector #1 and vector #2, and that the PENENABLE signal is consistently high. The output $\overline{Q}$ of the late-hit flip-fop 34 is set to a low state if a lightpen hit has been detected during the INTERPRET mode of the computer, i.e., during the period between vector #1 and vector #2. At the termination of the INTERPRET mode and as the vector generator is ready to draw vector #2 the beam will be set ON, i.e., BLANK- will go to a low state. The two low state input signals applied at the inverted inputs 41 and 42 of the AND gate 32 will cause its output 43 to go to a high state. This high state signal at the output 43 of the gate 32 is coupled via lead 44 through the NOR gate 29 to set the lightpen flip-flop 21 as soon as the beam comes ON. Since the vectors #1 and #2 are contiguous and the actual lightpen hit was detected at the end of or after the vector #1, the fact that the hit is registered in the computer at the beginning of the next vector, (i.e. of vector #2) results in no loss of useful information and the problem of handling lightpen hits during the computer INTERPRET mode is completely obviated.

The late-hit flip-flop 34 may be cleared by means of a signal applied to its CL input terminal. As shown in FIG. 2, the CL input terminal of the late-hit flip-flop 34 is coupled via lead 46 to the output terminal of a NOR gate 33 of a type having three inputs 47, 48, 49. The input 47 of the NOR gate 33 may be coupled to circuitry (not shown) that would generate a high state signal if the position of the beam of the CRT is reset in either or both orthogonal coordinates, X or Y. This would take place, for example, at the end of one drawn or displayed object or image, and while moving the beam in its off state to position it at the beginning of the next object or image to be displayed.

The next input 48 on NOR gate 33 is fed from circuitry (not shown) that will give a HIGH output and reset the late-hit flip-flop if an invisible vector is to be drawn unless that invisible vector was associated with the display of an alphanumeric character. This means that a lightpen hit within a character will be recorded correctly on that character, while a lightpen hit at the end of one character which carries over into the INTERPRET phase or mode will be recorded (appropriately) at the beginning of the next character. Since characters are generally small, this is a wholly consistent, expected and logical operation for the user. In general, lightpen hits on characters are used to position a string editing cursor, or simply to pick that string as a unit for movement, deletion etc. However, for the case where the display processor draws a geometric (non-character) invisible vector, the late-hit flip-flop 34 is cleared. This too seems to create appropriate responses from the system. Since invisible vectors may be of any length, it would be disconcerting for the user to have a hit on one area of the screen create a response in a remote area at the start of the next visible vector.

The third input 49 on NOR gate 33 may represent either one of two events, namely the resetting of the system or the disabling of the lightpen (i.e. when the PENENABLE signal goes to a low state). It is expected that in either one of the foregoing two events, a user would want to clear the late-hit flip-flop 34 as well as the lightpen flip-flop 21 as shown in FIG. 3.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A light pen control circuit for releasing a computer interrupt signal in response to a light pen hit signal generated by a light pen during or after a display of graphical information by a random scanning computer graphics system which is capable of displaying vectors having a drawing period shorter than the response time of the light pen, comprising:

means for generating a computer interrupt signal in response to a light pen hit signal generated within a predetermined interval corresponding to the display of graphical information or a prescribed period immediately thereafter;

means for determining whether the light pen hit signal occurred during or after the display of graphical information;

means for releasing the computer interrupt signal when the light pen hit signal occurred during the display of graphical information and for storing the computer interrupt signal when the light pen hit signal occurred after the display of graphical information; and means for selectively releasing the stored computer interrupt signal contemporaneously with a display of subsequent graphical information.

2. The light pen control circuit according to claim 1 wherein said determining means comprises:

means for generating a signal a prescribed period after the graphical information has been displayed; and a logic gate for producing an output signal which changes state upon the simultaneous occurrence of said generating means signal and said light pen hit signal.

3. The light pen control circuit according to claim 2 wherein said storing and releasing means comprises:

a flip-flop which is set in response to the output signal of said logic gate; and means for releasing a signal from said flip-flop upon a subsequent display of graphical information of a prescribed nature.

4. A method for releasing computer interrupt signal in response to a light pen signal generated by a light pen during or after a display of graphical information which may comprise vectors having a shorter drawing period than the response of the light pen comprising the steps of:

generating a computer interrupt signal in response to a light pen hit signal generated within an interval corresponding to the display of graphical information or a prescribed period immediately thereafter;

determining whether the light pen hit signal, which triggered the production of the computer interrupt signal, occurred before or after the display of graphical information;

releasing the computer interrupt signal when the light pen hit signal occurred during the display of graphical information and storing the computer interrupt signal when the light pen hit signal occurred after the display of graphical information; and selectively releasing the stored computer interrupt signal contemporaneously with a display of subsequent graphical information.

5. The method according to claim 4 wherein said determining step comprises the steps of:

generating the delay signal which terminates after a prescribed period following the display of the graphical information; and generating a control signal which changes state upon the simultaneous occurrence of said delay signal and a light pen hit signal.

6. The method according to claim 5 wherein said selectively releasing step comprises the steps of:

setting a flip-flop when said control signal changes states; and releasing an output signal from said flip-flop upon the subsequent display of graphical information of a prescribed nature.

* * * * *